Dec. 23, 1952 C. E. GOLDEN ET AL 2,622,615
FLOW CONTROL DEVICE
Filed April 29, 1946

INVENTORS
Carl E. Golden
Oscar L. Notley
BY
Heylor and Lassagne
ATTORNEYS

Patented Dec. 23, 1952

2,622,615

UNITED STATES PATENT OFFICE 2,622,615

FLOW CONTROL DEVICE

Carl E. Golden, Burlingame, and Oscar L. Notley,
San Francisco, Calif.

Application April 29, 1946, Serial No. 665,820

5 Claims. (Cl. 137—512)

1

This invention relates to flow control devices, and more particularly to a device adapted to be connected into a conventional conduit carrying fluids under fluctuant pressures so as to provide for a substantially constant rate of fluid flow therethrough.

An object of the invention is to provide a device adapted to control the volume of fluid passing therethrough so that the fluctuation of the pressure of the inlet fluid will not perceptibly vary the rate of outlet flow.

Another object of the invention is to provide a fluid flow control device adapted to provide a plurality of substantially constant flow rates therethrough selectively obtainable by a removal or insertion of the component parts thereof.

A further object of the invention is to provide a fluid flow control device having approximately the same size and shape of a conventional pipe coupling in external appearance, said device having an inlet passage terminating in a seat and a plurality of movable segments in Bernoulli effect relationship with said seat to provide for a substantially constant volume fluid flow from the outlet end of the device.

Other objects and advantages of the invention will be apparent from the following description taken in conjunction with the drawing forming part of this specification, and in which.

Figure 1:
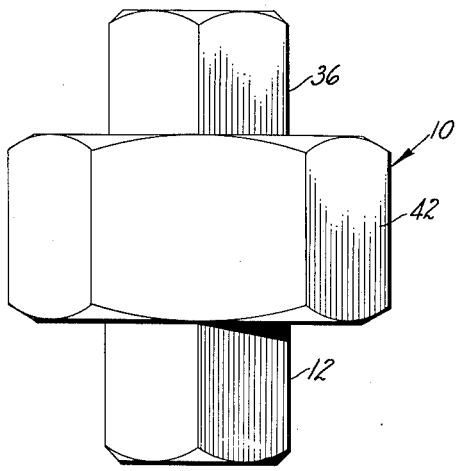
Fig. 1 is a view in elevation of the flow control device embodied in the invention.
Figure 2:
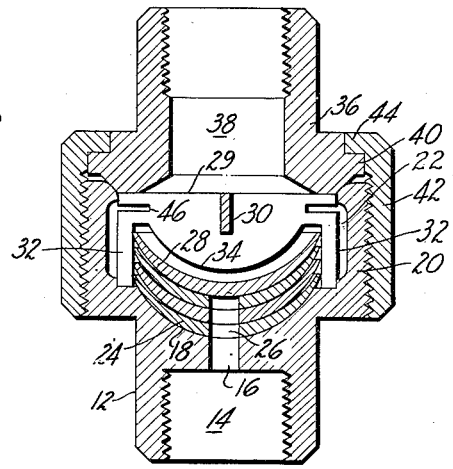
Fig. 2 is a sectional view taken on a plane passing through the longitudinal axis of the device of Fig. 1.

Referring to the drawing for more specific details of the invention, 10 indicates generally a flow control device comprising a body member 12 having an internally threaded inlet 14 communicating with a passage 16, a substantially semi-spherical concave seat 18 at the upper end of the passage 16, and an externally threaded sleeve 20 having an annular channel 22 in the inner surface thereof. A plurality of flow control segments 24, having centrally located apertures 26 therethrough adapted to register with the passage 16, are nested together in the seat 18. A non-apertured segment 28 is nested within the uppermost segment 24. Each of the segments 24 together with the segment 28 are of the same thickness and curvature, said segments having a

2 slightly greater radius of curvature for the concave faces thereof than for the convex faces so as to provide for a small degree of areal contact between adjacent segments.

Figure 3:
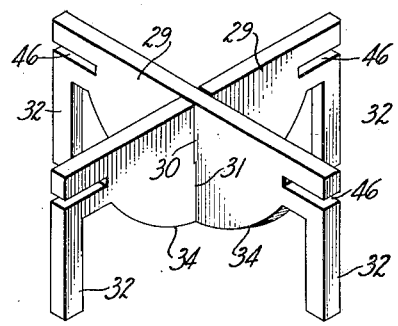
Fig. 3 is a view in perspective of one of the component parts shown in Fig. 2.

A pair of webs 29 having complementary medial slots 30 and 31 to provide for the transverse joining thereof, as shown in Fig. 3, legs 32 adapted to serve as vertical guide members for the segments 24 and 28, and semi-circular edges 34 adapted to serve as means for limiting the upward movement of segment 28, are supported by the body member 12.

An upper body member 36, having a partially threaded outlet passage 38 therethrough, is supported by the webs 30 and the sleeve 20, as shown, said member 36 having an external annular shoulder 40. An internally threaded coupling member 42 having a flange 44 is adapted to secure the member 36 in position through the pressing engagement of the flange 44 with the shoulder 40 of the member 36. A pair of slots 46 in each of the webs 30 allows for a slight downward springing of the ends of said webs under the tightening of the coupling 42 to provide for efficient sealing between the member 36 and the filleted upper end of the sleeve 20.

The lower end of the body member 12 and the upper end of the body member 36 have wrench-engaging hexagonally shaped external surfaces and the coupling 42 has a wrench-engaging octagonally shaped external surface for the ready incorporation of the flow control device in a fluid piping system.

Figure 4:
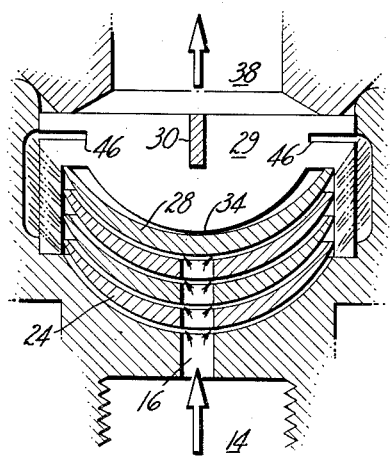
Fig. 4 is an enlarged view of the central portion of Fig. 1 showing the manner in which fluid passes through the device.

When the device is connected into a fluid piping system, the fluid flows through apertures 16 and 26 to impinge on the non-apertured segment 28, thereby raising said segment from nested contact with the next lower segment 24 to allow a fluid jet to issue therebetween. Since the jet has a relatively high velocity, it has a proportionally lower pressure according to the Bernoulli theorem which states that the pressure within a fluid stream is inversely proportional to the velocity of said stream. The issuing of the jet stream between the segment 28 and the next lower segment 26, therefore, causes a pressure drop at the upper face of said segment 26, thereby causing said segment to be urged upwardly to be spaced apart from the segment therebelow a distance equal to the spacing between said segment and the segment 28. As this spacing occurs, a jet stream issues therethrough to cause a pressure drop on the upper face of the segment in contact with said jet stream. In this manner, the remaining segments 26 become spaced apart from the seat 18 and from each other, as shown in Fig. 4.

The seat 18, segments 24, and segment 28 have equal spaces therebetween for all conditions of fluid flow through the device, but the magnitude of each space will vary equally as the pressure of the inlet fluid varies. Thus, if the inlet pressure increases, the velocity of each jet stream will increase equally to cause a corresponding decrease of pressure in each stream. The spacing between the component segments will thereupon decrease equally, as the segment 28 and the segments 24 are forced downwardly according to Bernoulli principles into the incoming fluid stream. The net result of the compacting of the component segments is to maintain the rate of fluid volume flow through the device at substantially the same value as existed before the inlet pressure increased, since the four jet streams are lesser in cross-sectional area upon the increase of fluid inlet pressure, but correspondingly higher in velocity.

Similarly, the volume of flow through the device will be maintained substantially constant should the fluid inlet pressure decrease. The velocity of the jet streams will thereby decrease with an attendant increase in pressure to cause the cross-sectional area of each jet stream to increase an equal amount.

The device is operable to provide a substantially constant flow rate therethrough if the non-apertured segment 28 is nested directly on the seat 18 in the absence of the apertured segments 24. At any specified inlet flow rate, the segment 48 is spaced a specific distance from the seat 18. If an apertured segment 24 is inserted between the segment 28 and the seat 18 and the same inlet flow rate prevails, the outlet flow rate will be doubled, since the segment 24 will be spaced the same distance from the seat 18 as the segment 28 is spaced from the segment 24, and each jet stream space will be equal to the space formerly existing between the seat 18 and the segment 28. Thus, each addition of a segment 24 will augment the outlet flow an equal amount. In Fig. 4 where three segments 24 and a single segment 28 are incorporated in the flow control device, the resultant outlet flow will be four times as great as if the segment 28 were used alone.

A wide range of substantially constant flow rates are thus obtainable in any fluid flow conduit by connecting the flow control device of the instant invention therein, and by inserting a predetermined number of apertured flow control segments 24 therein.

The fact that the radius of curvature of each of the segments 24 and 28 is greater for the concave surface than for the convex surface promotes the attaining of a substantially constant rate of fluid flow through the device and substantially eliminates water hammer in the operation thereof. Also, the variant facial curvatures of each segment allows for positional interchangeability of any segment within the group of nested segments without varying the interfacial area relationship between the segments.

While the preferred modification of the invention has been shown and described, it is understood that the scope of the invention is only limited by the appended claims.

What we claim as new and desire to secure by Letters Patent is:

1. A flow control device comprising a body having an inlet passage therein, a seat at the mouth of said inlet passage, a plurality of segments nestable within each other having apertures therethrough registering with the inlet passage, a non-apertured segment nested on top of the group of apertured segments, said segments being movable with respect to each other and to the seat in Bernoulli effect relationship under the influence of fluid flow through the inlet passage, and means carried within said body in normally spaced relation to said segments adapted to maintain said segments in Bernoulli effect relationship with each other and with said seat.

2. A flow control device comprising a body having an inlet passage therein, a semi-spherical seat at the mouth of said inlet passage, a plurality of semi-spherical segments nested within each other having apertures therethrough registering with the inlet passage, a non-apertured semi-spherical segment nested on top of the group of apertured segments, said segments being movable with respect to each other and to the seat in Bernoulli effect relationship under the influence of fluid flow through the inlet passage, and means carried within said body in normally spaced relation to said segments adapted to maintain said segments in Bernoulli effect relationship with each other and with said seat.

3. A flow control device comprising a body having an inlet passage therein, a semi-spherical seat at the mouth of said inlet passage, a plurality of semi-spherical segments nested within each other having apertures therethrough registering with the inlet passage and equal in diameter to said nozzle aperture, a non-apertured semi-spherical segment nested on top of the group of apertured segments, each of said segments having equal diameters and depths, said segments being movable with respect to each other and to the seat in Bernoulli effect relationship under the influence of fluid flow through the inlet passage, and means carried within said body in normally spaced relation to said segments adapted to maintain said segments in Bernoulli effect relationship with each other and with said seat.

4. A flow control device comprising a body having an inlet passage therein, a semi-spherical seat at the mouth of said inlet passage, a plurality of equi-sized semi-spherical segments nested within each other having apertures therethrough registering with the inlet passage and equal in diameter to said inlet passage, a non-apertured segment of identical contour with the apertured segments nested on top of the group of apertured segments, each of the segments having equal diameters and depths and being movable with respect to each other and to the seat in Bernoulli effect relationship under the influence of fluid flow through the inlet passage, and each of said segments having the radius of curvature of its concave surface slightly greater than the radius of curvature of the convex surface of the next adjacent segment, and means carried within said body in normally spaced relation to said segments adapted to maintain said segments in Bernoulli effect relationship with each other and with said seat.

5. A flow control device comprising a valve body having inlet and outlet passages, a concave and substantially semi-spherical seat at the inner end of the inlet passage, a plurality of segments each having an undersurface complementary to the surface of said seat, said segments being substantially in the form of hollow semi-spheres, whereby said segments may be nested together on the seat, said segments having alike curvatures for their upper surfaces and being tapered to have progressively lesser thickness from their centers toward their outer peripheries, whereby each segment is interchangeable with any other without varying the contactual areas between adjacent segments, said segments including at least one imperforate segment and at least one segment, located between said imperforate segment and said seat, having a centrally located aperture therethrough in axial alignment with said inlet passage.

CARL E. GOLDEN.
OSCAR L. NOTLEY.

REFERENCES CITED

The following references are of record in the file of this patent:

UNITED STATES PATENTS

| Number | Name | Date |
|---|---|---|
| 488,220 | Pollock | Dec. 20, 1892 |
| 573,157 | Meyer | Dec. 15, 1896 |
| 1,773,268 | Jenkins | Aug. 19, 1930 |

FOREIGN PATENTS

| Number | Country | Date |
|---|---|---|
| 14,167 | Great Britain | of 1892 |

OTHER REFERENCES

Engineering News-Record, Sept. 7, 1922, vol. 89, No. 10, pages 384, 385, and 386.